US012687140B2

(12) United States Patent
Matsuda et al.

(10) Patent No.: US 12,687,140 B2
(45) Date of Patent: Jul. 21, 2026

(54) INTERNAL COMBUSTION ENGINE SYSTEM, MOVABLE BODY, AND METHOD OF SUPPLYING FUEL TO FUEL CONSUMPTION APPARATUS

(71) Applicant: KAWASAKI MOTORS, LTD., Akashi (JP)

(72) Inventors: Yoshimoto Matsuda, Akashi (JP); Satoaki Ichi, Akashi (JP); Hiromitsu Kiyose, Kobe (JP); Yutaka Suzuki, Kobe (JP); Tomohide Hattori, Kobe (JP); Makoto Ninomiya, Kobe (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 18/859,130

(22) PCT Filed: May 9, 2023

(86) PCT No.: PCT/JP2023/017401

§ 371 (c)(1),
(2) Date: Oct. 22, 2024

(87) PCT Pub. No.: WO2023/243260

PCT Pub. Date: Dec. 21, 2023

(65) Prior Publication Data

US 2025/0290472 A1 Sep. 18, 2025

(30) Foreign Application Priority Data

Jun. 13, 2022 (JP) ................................. 2022-094861
Feb. 24, 2023 (JP) ................................. 2023-027032

(51) Int. Cl.
*F02M 21/02* (2006.01)

(52) U.S. Cl.
CPC .... *F02M 21/0239* (2013.01); *F02M 21/0218* (2013.01)

(58) Field of Classification Search
CPC ....................... F02M 21/0218; F02M 21/0239
See application file for complete search history.

(56) References Cited

U.S. PATENT DOCUMENTS

| | | | |
|---|---|---|---|
| 7,140,354 | B1 | 11/2006 | Hashemi |
| 2014/0261304 | A1 | 9/2014 | McAlister et al. |

(Continued)

FOREIGN PATENT DOCUMENTS

| | | | |
|---|---|---|---|
| CA | 2505455 | A1 | 7/2005 |
| DE | 102008029493 | A1 | 12/2009 |

(Continued)

OTHER PUBLICATIONS

Tsurutani, K. et al., "Fuel Feed System for Cylinder Direct Injection Gas Fuel Engine," Toyota Technical Publications, No. 13656, Jun. 28, 2002, 4 pages. Submitted with English translation of International Search Report Issued in Application No. PCT/JP2023/020206 for explanation of relevance.

(Continued)

*Primary Examiner* — Kevin A Lathers
(74) *Attorney, Agent, or Firm* — Alleman Hall LLP

(57) ABSTRACT

Processing circuitry of an internal combustion engine system is configured to perform: first control in which a valve system and a compressor are controlled such that while a fuel gas from a fuel storing source is being supplied to an internal combustion engine, the fuel gas from the fuel storing source is pressurized and filled in a charge tank; and second control in which the valve system is controlled such that the fuel gas from the charge tank is supplied to the internal combustion engine.

13 Claims, 7 Drawing Sheets

(56) References Cited

U.S. PATENT DOCUMENTS

| | | | |
|---|---|---|---|
| 2015/0307075 | A1 | 10/2015 | Leone |
| 2016/0245217 | A1 | 8/2016 | Takeuchi et al. |
| 2021/0301775 | A1 | 9/2021 | Puran et al. |
| 2021/0372350 | A1 | 12/2021 | Seba et al. |

FOREIGN PATENT DOCUMENTS

| | | | | |
|---|---|---|---|---|
| DE | 102017205910 | A1 | | 10/2018 |
| DE | 102018215847 | A1 | | 3/2020 |
| EP | 4497939 | A1 | | 1/2025 |
| JP | H0633836 | A | | 2/1994 |
| JP | 2004353458 | A | | 12/2004 |
| JP | 2006125220 | A | | 5/2006 |
| JP | 2008038680 | A | | 2/2008 |
| JP | 2012117495 | A | * | 6/2012 |
| JP | 2021173182 | A | | 11/2021 |
| WO | 2011053164 | A1 | | 5/2011 |
| WO | 2021165880 | A1 | | 8/2021 |
| WO | 2022266769 | A1 | | 12/2022 |

OTHER PUBLICATIONS

ISA Japan Patent Office, International Search Report Issued in Application No. PCT/JP2023/020206, Aug. 8, 2023, WIPO, 3 pages.

* cited by examiner

INTERNAL COMBUSTION ENGINE SYSTEM, MOVABLE BODY, AND METHOD OF SUPPLYING FUEL TO FUEL CONSUMPTION APPARATUS

CROSS REFERENCE TO RELATED APPLICATIONS

This application is a national phase application of International Application No. PCT/JP2023/017401, filed on May 9, 2023, entitled INTERNAL COMBUSTION ENGINE SYSTEM, MOBILE BODY, AND METHOD FOR SUPPLYING FUEL TO FUEL CONSUMPTION DEVICE, which in turn claims priority to Japanese Patent Applications No. 2022-094861 filed on Jun. 13, 2022 and No. 2023-027032 filed on Feb. 24, 2023, the entire disclosures of each of which are incorporated herein by reference for all purposes.

TECHNICAL FIELD

The present disclosure relates to an internal combustion engine system, a movable body, and a method of supplying fuel to a fuel consumption apparatus.

BACKGROUND ART

PTL 1 discloses an internal combustion engine system including an internal combustion engine which generates driving power by combusting fuel that is a hydrogen gas supplied from a high-pressure hydrogen gas tank through a pressure reducing valve.

CITATION LIST

Patent Literature

PTL 1: Japanese Laid-Open Patent Application Publication No. 2021-173182

SUMMARY OF INVENTION

Technical Problem

When a fuel gas in a fuel tank is continuously consumed by the operation of the internal combustion engine, internal pressure of the fuel tank finally lowers to less than a predetermined value. In this state, the fuel gas in the fuel tank cannot be appropriately supplied to the internal combustion engine. Although the fuel gas remains in the fuel tank, the fuel tank is regarded as an empty state.

An object of one aspect of the present disclosure is to increase the amount of fuel gas that can be supplied to an internal combustion engine.

Solution To Problem

An internal combustion engine system according to one aspect of the present disclosure includes: a fuel storing source including at least one fuel tank that stores a fuel gas in a compressed state; a main channel that connects the fuel storing source to an internal combustion engine; a charge tank; a charge channel that connects the fuel storing source to the charge tank; a compressor that pressurizes the fuel gas of the charge channel toward the charge tank; a sub-channel that connects the charge tank to the internal combustion engine; a valve system that opens and closes the main channel, the charge channel, and the sub-channel; and processing circuitry configured to control the valve system and the compressor. The processing circuitry is configured to perform first control in which the valve system and the compressor are controlled such that while the fuel gas from the fuel storing source is being supplied to the internal combustion engine, the fuel gas from the fuel storing source is pressurized and filled in the charge tank and second control in which the valve system is controlled such that the fuel gas from the charge tank is supplied to the internal combustion engine.

A method of supplying fuel to a fuel consumption apparatus according to one aspect of the present disclosure includes: while supplying a fuel gas from a fuel storing source to a fuel consumption apparatus, pressurizing the fuel gas from the fuel storing source by a compressor and filling the fuel gas in a charge tank; and when pressure of the fuel gas in the charge tank reaches a predetermined upper limit pressure value, stopping the supply of the fuel gas from the fuel storing source to the fuel consumption apparatus and supplying the fuel gas from the charge tank to the fuel consumption apparatus until the pressure of the fuel gas in the charge tank reaches a predetermined lower limit pressure value.

ADVANTAGEOUS EFFECTS OF INVENTION

According to one aspect of the present disclosure, even when the pressure of the fuel gas in the fuel storing source lowers, the fuel gas can be pressurized by the compressor, filled in the charge tank, and supplied from the charge tank to the internal combustion engine or the fuel consumption apparatus. Therefore, the amount of fuel gas that can be supplied to the internal combustion engine or the fuel consumption apparatus can be increased. Moreover, the fuel gas is supplied from the fuel storing source to the internal combustion engine or the fuel consumption apparatus, and at the same time, the fuel gas from the fuel storing source is pressurized and filled in the charge tank. Therefore, the compressor can be operated by effectively utilizing a time in which the fuel gas is being supplied from the fuel storing source to the internal combustion engine or the fuel consumption apparatus. Thus, the operation opportunity of the compressor can be increased, and this can reduce the compression amount of the compressor per unit time. Therefore, the size and required power of the compressor can be reduced.

DESCRIPTION OF EMBODIMENTS

Hereinafter, embodiments will be described with reference to the drawings.

Embodiment 1

Figure 1:
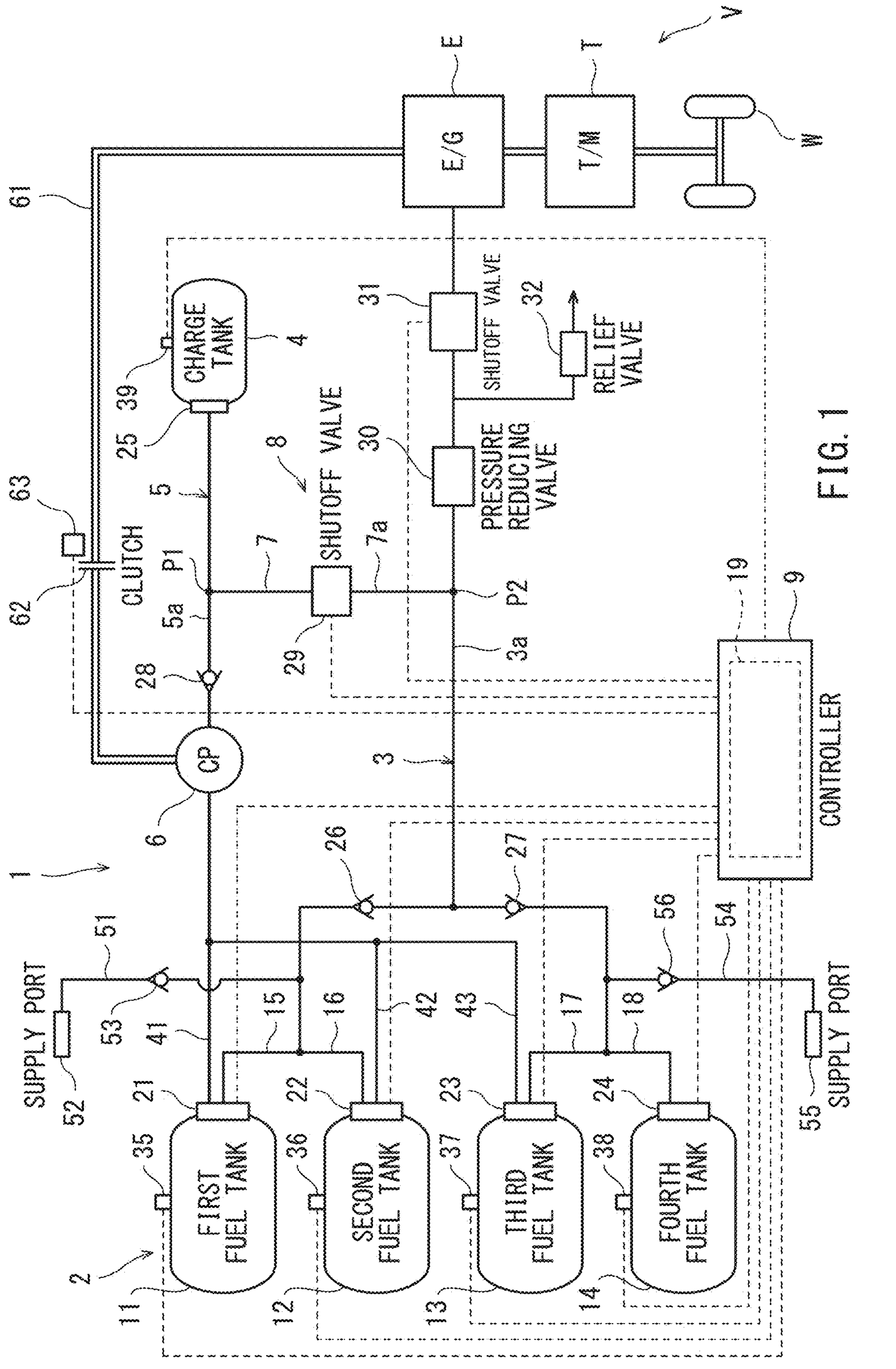
FIG. 1 is a block diagram of a movable body including an internal combustion engine system according to Embodiment 1.

FIG. 1 is a block diagram of a movable body V including an internal combustion engine system 1 according to Embodiment 1. As shown in FIG. 1, the internal combustion engine system 1 is mounted on the movable body V. The movable body V may be a manned vehicle or may be an unmanned vehicle. The movable body V is, for example, a vehicle including a driving wheel W. In the movable body V, driving power generated by an internal combustion engine E of the internal combustion engine system 1 is transmitted to the driving wheel W through a transmission T. Examples of the movable body V include two-wheeled vehicles, three-wheeled vehicles, four-wheeled vehicles, and railcars. The driving wheel W is one example of a propulsive power generator that generates propulsive power by the driving power generated by the internal combustion engine E of the internal combustion engine system 1. The movable body V may be a water vehicle, an aircraft, or the like. In this case, the propulsive power generator may be a propeller or a fan.

The internal combustion engine system 1 includes a fuel storing source 2. The fuel storing source 2 stores a fuel gas in a compressed state. Specifically, the fuel storing source 2 includes a first fuel tank 11, a second fuel tank 12, a third fuel tank 13, and a fourth fuel tank 14. These fuel tanks 11 to 14 store the fuel gas in a compressed state. Internal pressure of each of the fuel tanks 11 to 14 in a full state is higher than standard pressure (0.1 MPa), and specifically, adequately higher than fuel injection pressure required for the internal combustion engine E. The internal pressure of each of the fuel tanks 11 to 14 in a full state is, for example, 70 MPa. The fuel gas is, for example, a hydrogen gas. As a fuel amount required to obtain the same output of the internal combustion engine E, the amount of hydrogen gas is larger than the amount of carbon fuel, and therefore, the remaining amount of fuel gas in each of the fuel tanks 11 to 14 decreases more quickly. The fuel gas may include fuel that has been vaporized in a tank stored state, and may be a different type of fuel gas, such as hydrocarbon fuel.

The internal combustion engine system 1 includes the internal combustion engine E. The internal combustion engine E combusts the fuel gas supplied from the fuel storing source 2, converts its combustion energy into rotational energy, and outputs the rotational energy as the driving power. The internal combustion engine E is one example of a fuel consumption apparatus. The internal combustion engine E is, for example, a direct injection engine. In the present embodiment, the internal combustion engine E is a reciprocating engine. In this case, the internal combustion engine E explodes the fuel gas in a cylinder and generates a reciprocating movement of a piston by the expansion of the gas in the cylinder. The reciprocating movement of the piston is converted into a rotational movement of a crank shaft of the internal combustion engine E and is then output.

The internal combustion engine E needs to be supplied with the fuel gas having predetermined fuel injection pressure that is higher than the standard pressure (0.1 MPa). Required pressure of the fuel gas to be supplied to the direct injection engine is higher than required pressure of the fuel gas to be supplied to a non-direct injection engine. According to the direct injection engine, when a gas in a combustion chamber of the cylinder has become a compressed state by the piston, the fuel gas is directly supplied to the combustion chamber. When the direct injection engine is used as the internal combustion engine E, the internal combustion engine E needs to be supplied with the fuel gas having pressure of, for example, 10 MPa or more from the fuel storing source.

Therefore, when a channel from the fuel storing source to a fuel injector of the internal combustion engine has a simple configuration, and the pressure of the fuel gas in the fuel storing source is less than 10 MPa, the fuel gas cannot be injected from the fuel injector in the internal combustion engine, and the fuel storing source 2 is regarded as an empty state. To be specific, in a case where the channel from the fuel storing source to the fuel injector of the internal combustion engine has a simple configuration, the amount of fuel gas remaining in the fuel storing source when the fuel storing source is regarded as the empty state becomes large. However, according to the internal combustion engine system 1 of the present embodiment, as will be described later, the fuel gas in the fuel storing source 2 is utilized as much as possible for the supply to the internal combustion engine E. Therefore, the fuel gas in the fuel storing source 2 is efficiently utilized.

The internal combustion engine system 1 includes a main channel 3 that connects the fuel storing source 2 to the internal combustion engine E. Specifically, the main channel 3 includes a first main channel 15, a second main channel 16, a third main channel 17, and a fourth main channel 18. The first main channel 15 connects the first fuel tank 11 to the internal combustion engine E. The second main channel 16 connects the second fuel tank 12 to the internal combustion engine E. The third main channel 17 connects the third fuel tank 13 to the internal combustion engine E. The fourth main channel 18 connects the fourth fuel tank 14 to the internal combustion engine E. In the present embodiment, the first to fourth main channels 15 to 18 are joined to each other while extending toward the internal combustion engine E. To be specific, downstream portions of the first to fourth main channels 15 to 18 are combined with each other. A common channel portion 3*a* of the main channel 3 which is configured by combining the downstream portions of the first to fourth main channels 15 to 18 is connected to the internal combustion engine E.

The internal combustion engine system 1 includes a charge tank 4. The volume of the charge tank 4 is not especially limited. In the present embodiment, the volume of the charge tank 4 is smaller than the volume of each of the fuel tanks 11 to 14. In the present embodiment, the charge tank 4 is smaller than each of the fuel tanks 11 to 14. Maximum allowable internal pressure of the charge tank 4 is smaller than maximum allowable internal pressure of each of the fuel tanks 11 to 14. The internal combustion engine system 1 includes a charge channel 5. The charge channel 5 includes a first charge channel 41, a second charge channel 42, and a third charge channel 43. The first charge channel 41 connects the first fuel tank 11 to the charge tank 4. The second charge channel 42 connects the second fuel tank 12 to the charge tank 4. The third charge channel 43 connects the third fuel tank 13 to the charge tank 4. The fourth fuel tank 14 is not connected to the charge tank 4.

In the present embodiment, downstream portions of the first to third charge channels 41 to 43 are combined with each other. The first to third charge channels 41 to 43 are joined to each other while extending toward the charge tank 4. To be specific, a common channel portion 5*a* of the charge channel 5 which is configured by combining the downstream portions of the first to third charge channels 41 to 43 is connected to the charge tank 4. A compressor 6 is located at the common channel portion 5*a* of the charge channel 5. To be specific, the compressor 6 pressurizes, toward the charge tank 4, the fuel gas flowing from the first to third fuel tank valves 11 to 13 to the charge channel 5. The fuel gas which has been pressurized by the compressor 6 is temporarily stored in the charge tank 4. The compressor 6 is not especially limited but may be, for example, a reciprocating pump, a diaphragm pump, a booster pump, a roots pump, or a plunger pump.

In the present embodiment, the compressor 6 is driven by utilizing the energy generated by the internal combustion engine E. The compressor 6 is mechanically driven by the internal combustion engine E. In the present embodiment, rotational power of a rotary member that rotates in accordance with the driving of the internal combustion engine E is applied as driving power to the compressor 6. The rotary member of the internal combustion engine E may be a rotating shaft, such as a crank shaft, a camshaft, or a balancer shaft. The rotary member that applies the driving power to the compressor 6 may be a shaft of the transmission T connected to the internal combustion engine E.

The rotational power generated by the internal combustion engine E is transmitted to the compressor 6 through a power transmitting path 61. The power transmitting path 61 is one example of an energy transmitting path through which the energy generated by the internal combustion engine E is transmitted as the rotational power to the compressor 6. The power transmitting path 61 may include at least one of a shaft, a gear mechanism, a belt-pulley mechanism, and a chain-sprocket mechanism. A clutch 62 is located at the power transmitting path 61. The clutch 62 establishes and cuts the power transmitting path 61. The clutch 62 is one example of an energy transmission selector that establishes and cuts the energy transmitting path. The clutch 62 is driven by an actuator 63. To be specific, the actuator 63 is controlled, and therefore, the clutch 62 is controlled. As a result, the compressor 6 is controlled. The actuator 63 may be, for example, a hydraulic actuator or an electric actuator.

The internal combustion engine system 1 includes a sub-channel 7. The sub-channel 7 connects the charge tank 4 to the internal combustion engine E. Specifically, the sub-channel 7 includes a bridge channel 7*a* that connects the common channel portion 5*a* of the charge channel 5 to the common channel portion 3*a* of the main channel 3. A portion of the common channel portion 5*a* of the charge channel 5*a* which is located downstream of a joining point P1 serves as a part of the sub-channel 7. The joining point P1 is a point where the bridge channel 7*a* and the common channel portion 5*a* of the charge channel 5 are joined to each other. A portion of the common channel portion 3*a* of the main channel 3 which is located downstream of a joining point P2 serves as a part of the sub-channel 7. The joining point P2 is a point where the bridge channel 7*a* and the common channel portion 3*a* of the main channel 3 are joined to each other. The fuel gas in the charge tank 4 may be supplied to the internal combustion engine E through the portion of the common channel portion 5*a* of the charge channel 5*a* which is located downstream of the joining point P1, the bridge channel 7*a*, and the portion of the common channel portion 3*a* of the main channel 3 which is located downstream of the joining point P2.

The internal combustion engine system 1 includes a valve system 8. The valve system 8 opens and closes the main channel 3, the charge channel 5, and the sub-channel 7. The configuration of the valve system 8 is not limited to a specific form. To be specific, the valve system 8 may adopt various forms as long as it can open and close the main channel 3, the charge channel 5, and the sub-channel 7. As one example, the valve system 8 includes a first fuel tank valve 21, a second fuel tank valve 22, a third fuel tank valve 23, a fourth fuel tank valve 24, a charge tank valve 25, check valves 26 to 28, shutoff valves 29 and 31, a pressure reducing valve 30, and a relief valve 32. The first fuel tank valve 21, the second fuel tank valve 22, the third fuel tank valve 23, the fourth fuel tank valve 24, the charge tank valve 25, and the shutoff valves 29 and 31 are, for example, electromagnetic valves that are electrically controllable.

The first fuel tank valve 21 operates in a closed state in which a port of the first fuel tank 11 is closed, a first open state in which the port of the first fuel tank 11 communicates with the first main channel 15 but does not communicate with the first charge channel 41, or a second open state in which the port of the first fuel tank 11 communicates with the first charge channel 41 but does not communicate with the first main channel 15.

The second fuel tank valve 22 operates in a closed state in which a port of the second fuel tank 12 is closed, a first open state in which the port of the second fuel tank 12 communicates with the second main channel 16 but does not communicate with the second charge channel 42, or a second open state in which the port of the second fuel tank 12 communicates with the second charge channel 42 but does not communicate with the second main channel 16.

The third fuel tank valve 23 operates in a closed state in which a port of the third fuel tank 13 is closed, a first open state in which the port of the third fuel tank 13 communicates with the third main channel 17 but does not communicate with the third charge channel 43, or a second open state in which the port of the third fuel tank 13 communicates with the third charge channel 43 but does not communicate with the third main channel 17.

Each of the first to third fuel tank valves 21 to 23 may be, for example, a three-way valve. The first fuel tank valve 21 may include an on-off valve that makes the port of the first fuel tank 11 communicate with the first main channel 15 and an on-off valve that makes the port of the first fuel tank 11 communicate with the first charge channel 41. Similarly, each of the second and third fuel tank valve 22 and 23 may include two on-off valves.

The fourth fuel tank valve 24 operates in a closed state in which a port of the fourth fuel tank 14 is closed or an open state in which the port of the fourth fuel tank 14 communicates with the fourth main channel 18. The charge tank valve 25 operates in a closed state in which a port of the charge tank 4 is closed or an open state in which the port of the charge tank 4 communicates with the charge channel 5.

The check valves 26 and 27 allow the flow in the main channel 3 toward the internal combustion engine E and blocks its opposite flow. Specifically, the check valve 26 allows the flow in the main channel 3 from the first fuel tank 11 and the second fuel tank 12 toward the internal combustion engine E and blocks the flow in the main channel 3 toward the first fuel tank 11 and the second fuel tank 12. The check valve 27 allows the flow in the main channel 3 from the third fuel tank 13 and the fourth fuel tank 14 toward the internal combustion engine E and blocks the flow in the main channel 3 toward the third fuel tank 13 and the fourth fuel tank 14.

The check valve 28 is located at the common channel portion 5*a* of the charge channel 5. Specifically, the check valve 28 is located at a portion between the compressor 6 and the joining point P1 where the bridge channel 7*a* of the sub-channel 7 and the common channel portion 5*a* of the charge channel 5 are joined to each other. The check valve 28 allows the flow in the charge channel 5 from the first fuel tank 11, the second fuel tank 12, and the third fuel tank 13 toward the charge tank 4 and blocks its opposite flow.

The shutoff valve 29 opens and closes the bridge channel 7*a* of the sub-channel 7. To be specific, when the shutoff valve 29 opens, the fuel gas in the charge tank 4 may be supplied to the common channel portion 3*a* of the main channel 3 through the sub-channel 7.

The pressure reducing valve 30 is located at the common channel portion 3*a* of the main channel 3. Specifically, the pressure reducing valve 30 is located at a portion located downstream of the joining point P2 where the bridge portion 7*a* of the sub-channel 7 and the common channel portion 3*a* of the main channel 3 are joined to each other. The pressure reducing valve 30 reduces the pressure of the fuel gas in the main channel 3 to predetermined pressure suitable for the internal combustion engine E. The pressure reducing valve 30 maintains the pressure in a portion of the main channel 3 which is located downstream of the pressure reducing valve 30, at predetermined fuel injection pressure (10 MPa, for example) of the internal combustion engine E. The pressure reducing valve 30 is a valve that opens a bypass passage, through which upstream and downstream sides of an internal channel of the valve communicate with each other, when the pressure at the downstream side of the internal channel becomes lower than the fuel injection pressure. When the pressure at the downstream side of the internal channel exceeds the fuel injection pressure, the pressure reducing valve 30 closes the bypass passage. Thus, the pressure of the fuel gas flowing through a downstream side of the pressure reducing valve 30 is made lower than the pressure of the fuel gas flowing through an upstream side of the pressure reducing valve 30 such that the pressure of the fuel gas to be supplied from the main channel 3 to the internal combustion engine E is maintained at the predetermined fuel injection pressure.

The shutoff valve 31 opens and closes a portion of the common channel portion 3*a* of the main channel 3 which is located downstream of the pressure reducing valve 30. For example, the shutoff valve 31 can shut off the supply of the fuel gas from the main channel 3 to the internal combustion engine E in an emergency or the like and is located at a portion of the main channel 3 which is located downstream of the pressure reducing valve 30. When the pressure of a portion of the common channel portion 3*a* of the main channel 3 which is located between the pressure reducing valve 30 and the shutoff valve 31 exceeds predetermined relief pressure, the relief valve 32 discharges the fuel gas of the common channel portion 3*a* of the main channel 3 to a hydrogen collector or to an outside. A destination to which the relief valve 32 discharges the fuel gas may be a portion where the pressure is set to be low, among all of the channels in the internal combustion engine system 1. Moreover, the relief valve 32 may be omitted.

A first fuel tank pressure sensor 35 detects the pressure of the fuel gas stored in the first fuel tank 11. A second fuel tank pressure sensor 36 detects the pressure of the fuel gas stored in the second fuel tank 12. A third fuel tank pressure sensor 37 detects the pressure of the fuel gas stored in the third fuel tank 13. A fourth fuel tank pressure sensor 38 detects the pressure of the fuel gas stored in the fourth fuel tank 14. A charge tank pressure sensor 39 detects the pressure of the fuel gas stored in the charge tank 4.

The internal combustion engine system 1 includes a component that supplies the fuel gas to the first to fourth fuel tanks 11 to 14. Specifically, a first supply channel 51 is connected to a portion, located upstream of the check valve 26, of the combined portion of the first main channel 15 and the second main channel 16. A supply port 52 is located at an end portion of the first supply channel 51. A check valve 53 is located at the first supply channel 51. The check valve 53 allows the flow from the supply port 52 toward the first fuel tank 11 and the second fuel tank 12 and blocks its opposite flow.

A second supply channel 54 is connected to a portion, located upstream of the check valve 27, of the combined portion of the third main channel 17 and the fourth main channel 18. A supply port 55 is located at an end portion of the second supply channel 54. A check valve 56 is located at the second supply channel 54. The check valve 56 allows the flow from the supply port 55 toward the third fuel tank 13 and the fourth fuel tank 14 and blocks its opposite flow. The fuel gas may be supplied to the first to fourth fuel tanks 11 to 14 from one supply port, or supply ports corresponding to the respective fuel tanks 11 to 14 may be included.

The internal combustion engine system 1 includes a controller 9. The controller 9 controls the valve system 8 and the actuator 63 based on detection signals of the sensors 21 to 25. The controller 9 includes processing circuitry 19. The controller 9 includes, for example, a processor, a system memory, and a storage memory. The processor includes, for example, a central processing unit (CPU). The system memory is, for example, a RAM. The storage memory may include a ROM. The storage memory may include a hard disk, a flash memory, or a combination thereof. The storage memory stores a program. A configuration in which the processor executes the program read out into the system memory is one example of the processing circuitry 19.

Figure 2:
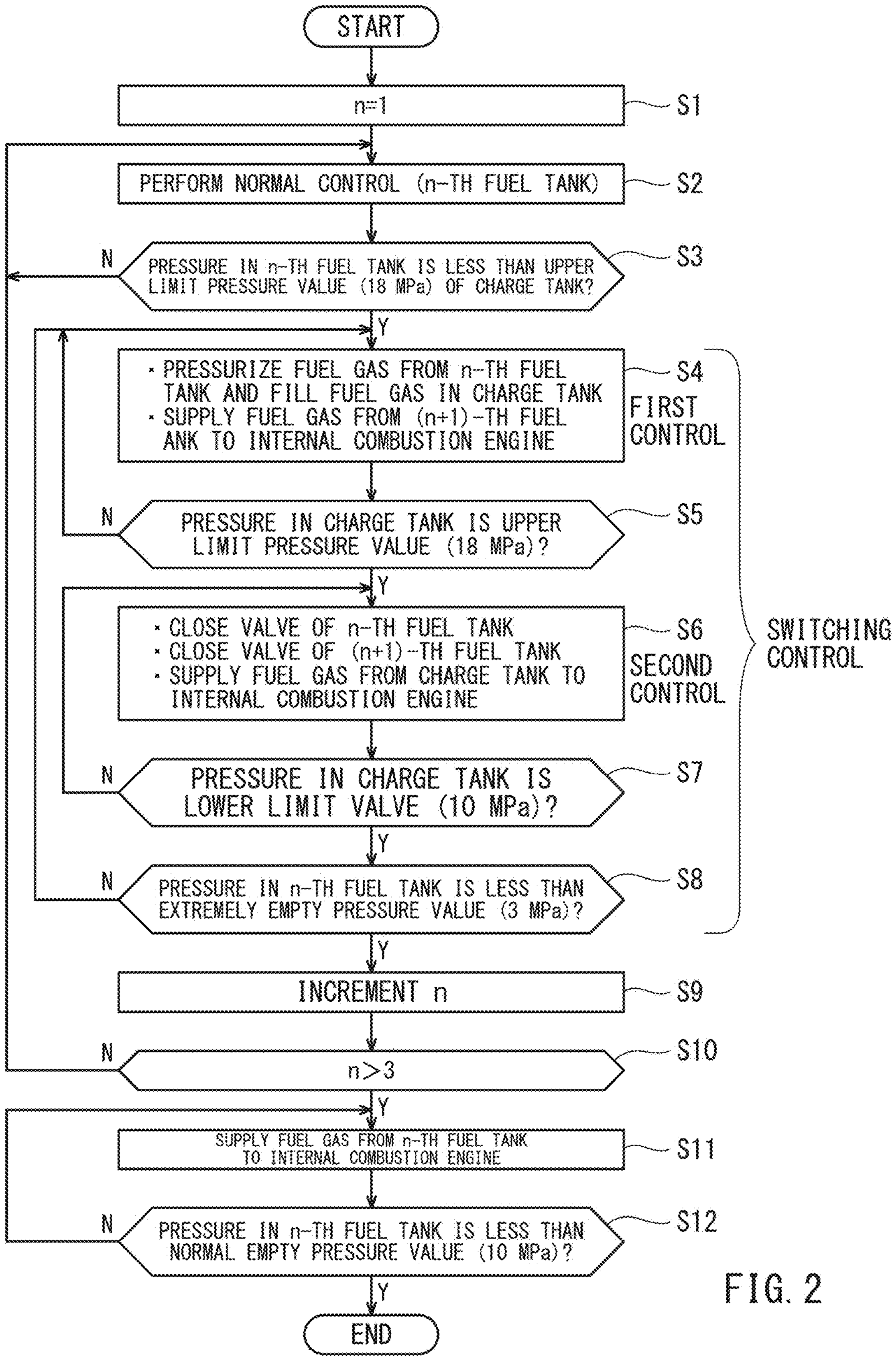
FIG. 2 is a flowchart for explaining control of the system of FIG. 1.
Figure 3:
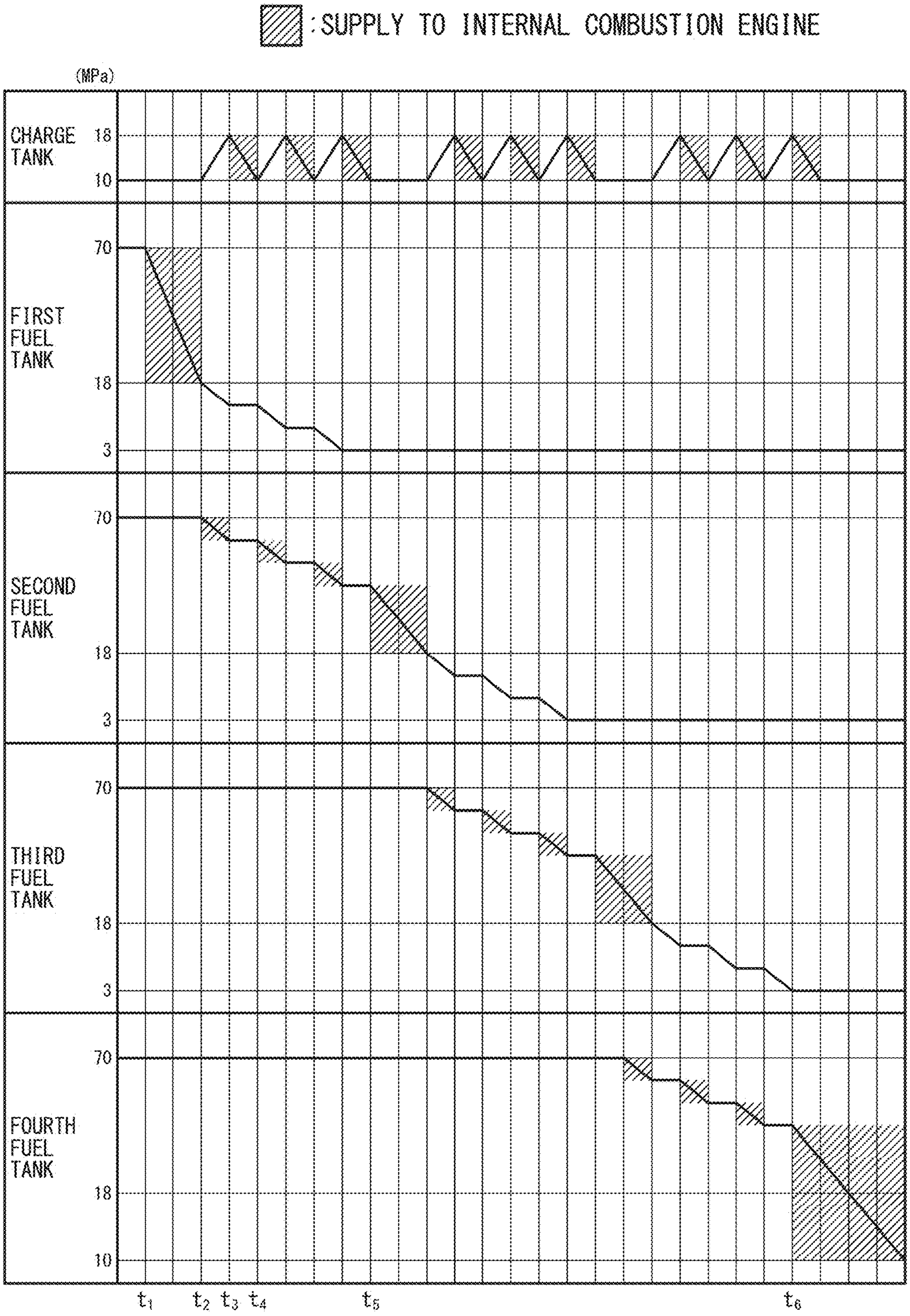
FIG. 3 is a timing chart showing the states of tanks of the system of FIG. 1.

FIG. 2 is a flowchart for explaining the control of the system 1 of FIG. 1. FIG. 3 is a timing chart showing the states of the tanks 11 to 15 of the system 1 of FIG. 1. Hereinafter, the processing of the processing circuitry 19 of the controller 9 will be described based on the flow of FIG. 2 with reference to the configuration of FIG. 1 and the timing chart of FIG. 3. First, the processing circuitry 19 substitutes "1" in a variable n that is a natural number related to the number of the fuel tank (Step S1). The processing circuitry 19 performs "normal control" in which the fuel gas in an n-th fuel tank, i.e., the first fuel tank 11 is supplied to the internal combustion engine E (Step S2; a time point t1 in FIG. 3). The normal control is control in which when the pressure of the fuel gas stored in the n-th fuel tank is predetermined upper limit pressure value of the charge tank 4 or more, the fuel gas from the n-th fuel tank is supplied to the internal combustion engine E with the charge channel 5 in a closed state.

Specifically, the processing circuitry 19 sets the second to fourth fuel tank valves 22 to 24 to a closed state. In addition, the processing circuitry 19 sets the first fuel tank valve 21 to the first open state in which the port of the first fuel tank 11 communicates with the first main channel 15 but does not communicate with the first charge channel 41. At this time, the processing circuitry 19 closes the shutoff valve 29, opens the shutoff valve 31, and disengages the clutch 62 to stop the compressor 6. Thus, the fuel gas from the first fuel tank 11 is supplied to the internal combustion engine E with the charge channel 5 in a closed state.

The processing circuitry 19 determines whether or not the internal pressure of the first fuel tank 11 which is detected by the first fuel tank pressure sensor 35 is less than the predetermined upper limit pressure value (18 MPa, for example) of the charge tank 4 (Step S3). The upper limit pressure value is set higher than a required pressure value of the fuel gas to be supplied to the internal combustion engine E. Moreover, the upper limit pressure value may be set lower than a withstand pressure value of the charge tank 4. When it is determined that the internal pressure of the first fuel tank 11 is not less than the upper limit pressure value of the charge tank 4 (No in Step S3), the processing circuitry 19 returns to Step S2.

When it is determined that the internal pressure of the first fuel tank 11 is less than the upper limit pressure value of the charge tank 4 (Yes in Step S3), the processing circuitry 19 executes "first control" (Step S4; a time point t2 in FIG. 3). The first control is control in which the valve system 8 and the compressor 6 are controlled such that while the fuel gas from the second fuel tank 12 is being supplied to the internal combustion engine E, the fuel gas from the first fuel tank 11 is pressurized and filled in the charge tank 4. Thus, the first fuel tank 11 and the second fuel tank 12 perform their respective roles, and both of the fuel supply to the internal combustion engine E and the fuel filling of the charge tank 4 are easily performed. Moreover, the fuel gas of the first fuel tank 11 which has been reduced in pressure is pressurized by the compressor 6. Therefore, as compared to when pressurizing a high-pressure fuel gas, a compression ability required for the compressor 6 does not have to be high.

Specifically, the processing circuitry 19 opens the charge tank valve 25, sets the first fuel tank valve 21 to the second open state in which the port of the first fuel tank 11 communicates with the first charge channel 41 but does not communicate with the first main channel 15, and controls the actuator 63 to engage the clutch 62 and thereby operate the compressor 6. Thus, the fuel gas from the first fuel tank 11 is pressurized by the compressor 6 and is then filled in the charge tank 4. Instead of switching between the communication and shut-off between the first fuel tank 11 and the charge tank 4 by the charge tank valve 25, the communication and shut-off between the first fuel tank 11 and the charge tank 4 may be switched by the first fuel tank valve 21. In this case, the port of the charge tank 4 may remain open.

Simultaneously, the processing circuitry 19 sets the second fuel tank valve 22 to the second open state in which the port of the second fuel tank 12 communicates with the first main channel 15 but does not communicate with the second charge channel 42. Thus, the fuel gas in a (n+1)-th fuel tank, i.e., the second fuel tank 12 is supplied to the internal combustion engine E.

When an instantaneous temporary stop of the fuel supply to the internal combustion engine E that is operating is allowed, the start of the communication between the first fuel tank 11 and the charge tank 4 and the start of the fuel supply from the second fuel tank 12 to the internal combustion engine E do not have to be completely simultaneous with each other. One example may be such that the communication of the first fuel tank 21 with the first main channel 15 is blocked, the communication of the second fuel tank 12 with the second main channel 16 is then started, and the communication of the first fuel tank 11 with the charge tank 4 is then started.

The processing circuitry 19 determines whether or not the internal pressure of the charge tank 4 which is detected by the charge tank pressure sensor 39 has reached the upper limit pressure value (18 MPa, for example) (Step S5). The upper limit pressure value in Step S5 and the upper limit pressure value in Step S3 may be different from each other. When it is determined that the internal pressure of the charge tank 4 has not reached the upper limit pressure value (No in Step S5), the processing circuitry 19 returns to Step S4.

When it is determined that the internal pressure of the charge tank 4 has reached the upper limit pressure value (Yes in Step S5), the processing circuitry 19 executes "second control" (Step S6; a time point t3 in FIG. 3). The second control is control in which the valve system 8 is controlled such that the fuel gas from the charge tank 4 is supplied to the internal combustion engine E. In the present embodiment, during the execution of the second control, the supply of the fuel gas from the fuel storing source 2 to the internal combustion engine E is stopped. Specifically, the processing circuitry 19 controls the actuator 63 to disengage the clutch 62 and thereby set the compressor 6 to a non-driving state, sets the first fuel tank valve 21 and the second fuel tank valve 22 to a closed state, and opens the charge tank valve 25 and the shutoff valve 29 to supply the fuel gas of the charge tank 4 to the internal combustion engine E. When the instantaneous temporary stop of the fuel supply to the internal combustion engine E that is operating is allowed, the switching operations of the valves do not have to be completely simultaneous with each other.

The second control is executed immediately after the first control. Therefore, the fuel gas filled in the charge tank 4 is utilized for the supply to the internal combustion engine E, and use opportunity of the charge tank 4 increases. The second control does not have to be executed immediately after the first control. For example, control in which the first fuel tank valve 21 and the charge tank valve 25 are set to a closed state, the compressor 6 is set to a non-driving state, and the second fuel tank valve 22 is set to the first open state such that the fuel gas is supplied from the second fuel tank 12 to the internal combustion engine E, may be performed between the first control and the second control.

The processing circuitry 19 determines whether or not the internal pressure of the charge tank 4 which is detected by the charge tank pressure sensor 39 has reached a predetermined lower limit pressure value (10 MPa, for example) (Step S7). The lower limit pressure value corresponds to a lower limit of pressure required to supply the fuel gas to the internal combustion engine E. When it is determined that the internal pressure of the charge tank 4 has not reached the lower limit pressure value (No in Step S7), the processing circuitry 19 returns to Step S6.

When it is determined that the internal pressure of the charge tank 4 has reached the lower limit pressure value (Yes in Step S7), the processing circuitry 19 determines whether or not the internal pressure of the n-th fuel tank, i.e., the first fuel tank 11 is less than a predetermined extremely empty pressure value (3 MPa, for example) (Step S8). The extremely empty pressure value may also be called a first empty pressure value. The extremely empty pressure value is a pressure limit value at which the fuel gas can be pressurized by the compressor 6 and filled in the charge tank 4. When it is determined that the internal pressure of the first fuel tank 11 is not less than the extremely empty pressure value (3 MPa, for example) (No in Step S8), the processing circuitry 19 returns to Step S4 (a time point t4 in FIG. 3). To be specific, in a predetermined period of time in a process in which the first fuel tank 11 changes from a non-empty state to the extremely empty state, the processing circuitry 19 executes switching control in which the first control and the second control are alternately repeated.

When it is determined that the internal pressure of the first fuel tank 11 is less than the extremely empty pressure value (3 MPa, for example) (Yes in Step S8), the processing circuitry 19 increments the variable n from "1" to "2" (Step S9). The processing circuitry 19 determines whether or not the variable n is more than "3" (Step S10). When it is determined that the variable n is not more than "3" (No in Step S10), the processing circuitry returns to Step S2. To be specific, the processing circuitry 19 sets the first fuel tank valve 21 and the charge tank valve 25 to a closed state and sets the compressor 6 to a non-driving state, and then, performs the normal control in which the fuel gas in the n-th fuel tank, i.e., the second fuel tank 12 is supplied to the internal combustion engine E (Step S2; a time point t5 in FIG. 3).

As above, a set of the normal control in Step S2 and the switching control in Steps S4 to S8 is repeated in accordance with an update of the variable n. Then, when it is determined that the variable n is more than "3" (Yes in Step S10), the processing circuitry 19 controls the valve system 8 such that the fuel gas in the n-th fuel tank, i.e., the fourth fuel tank 14 is supplied to the internal combustion engine E (Step S11; a time point t6 in FIG. 3). Specifically, the processing circuitry 19 controls the actuator 63 to disengage the clutch 62 and thereby set the compressor 6 to a non-driving state, sets the first to third fuel tank valves 21 to 23 and the shutoff valve 29 to a closed state, and sets the fourth fuel tank valve 24 to an open state.

The processing circuitry 19 determines whether or not the internal pressure of the n-th fuel tank, i.e., the fourth fuel tank 14 is less than a normal empty pressure value (10 MPa, for example) (Step S12). The normal empty pressure value may also be called a second empty pressure value. The normal empty pressure value is a value larger than the extremely empty pressure value and corresponds to a required pressure value of the fuel gas to be supplied to the internal combustion engine E. When it is determined that the internal pressure of the fourth fuel tank 14 is not less than the normal empty pressure value (10 MPa, for example) (No in Step S12), the processing circuitry 19 returns to Step S11. When it is determined that the internal pressure of the fourth fuel tank 14 is less than the normal empty pressure value (10 MPa, for example) (Yes in Step S12), the processing circuitry 19 closes the fourth fuel tank valve 24 to stop the internal combustion engine E.

When a power source of the internal combustion engine system 1 is turned off in the middle of the flow of FIG. 2, the processing circuitry 19 stores a latest state of the progress of the flow, and when the power source is turned on next time, starts the flow from where it has stopped last time.

According to the above-described configuration, even when the pressure of the fuel gas in any one of the first to third fuel tanks 11 to 13 lowers, the fuel gas can be pressurized by the compressor 6, filled in the charge tank 4, and supplied from the charge tank 4 to the internal combustion engine E. Therefore, the amount of fuel gas that can be supplied to the internal combustion engine E can be increased, and this can increase a cruising distance of the movable body V.

Moreover, the fuel gas is supplied from the (n+1)-th fuel tank (the second fuel tank 12, for example) to the internal combustion engine E, and at the same time, the fuel gas from the n-th fuel tank (the first fuel tank 11, for example) is pressurized and filled in the charge tank 4. Therefore, the compressor 6 can be operated by effectively utilizing a time in which the fuel gas is being supplied from the (n+1)-th fuel tank 12 to the internal combustion engine E. Thus, operation opportunity of the compressor 6 can be increased, and this can reduce a compression amount of the compressor 6 per unit time. Therefore, the size and required power of the compressor 6 can be reduced.

Moreover, since the switching control in which the first control and the second control are alternately repeated is executed, the operation of filling the charge tank 4 with the fuel gas and supplying the fuel gas from the charge tank 4 to the internal combustion engine E is executed plural times. Therefore, the upper limit pressure value and volume of the fuel gas to be pressurized and filled in the charge tank 4 do not have to be made large. Thus, the necessity of increasing the withstand pressure performance and volume of the charge tank 4 can be eliminated.

In the above-described embodiment, the energy transmitting path through which the energy generated by the internal combustion engine E is transmitted to the compressor 6 is a mechanical energy path that is the power transmitting path 61, but may be a hydraulic energy path. When the energy transmitting path is a hydraulic path, an oil control valve may be used as the energy transmission selector instead of the clutch 62. Moreover, in the above-described embodiment, the number of fuel tanks constituting the fuel storing source is four. However, the number of fuel tanks constituting the fuel storing source may be two, three, or five or more, or may be one as in Embodiment 2 described later.

The fourth fuel tank 14 may be connected to the charge tank 4. In this case, the fuel gas remaining in the fourth fuel tank 14 can be used for the combustion in the internal combustion engine E after the pressure of the fuel gas remaining in the fourth fuel tank 14 is increased by the compressor. Moreover, even when the fuel gas in the fourth fuel tank 14 is consumed prior to the fuel gas in the fuel tanks 11 to 13, the amount of unconsumed fuel gas remaining in the fourth fuel tank 14 can be reduced.

The clutch 62 and the actuator 63 may be omitted. In this case, a relief valve may be located, which discharges the fuel gas of a portion of the charge channel 5 which is located downstream of the compressor 6 to a portion thereof located upstream of the compressor 6 when the pressure at the downstream side of the compressor 6 exceeds a predetermined value even in a period of time in which the compression of the fuel gas in the charge channel 5 is unnecessary.

To prevent the shortage of the fuel supply to the internal combustion engine E when switching among the normal control, the first control, and the second control, an accumulator may be located upstream of the pressure reducing valve 30.

Figure 4:
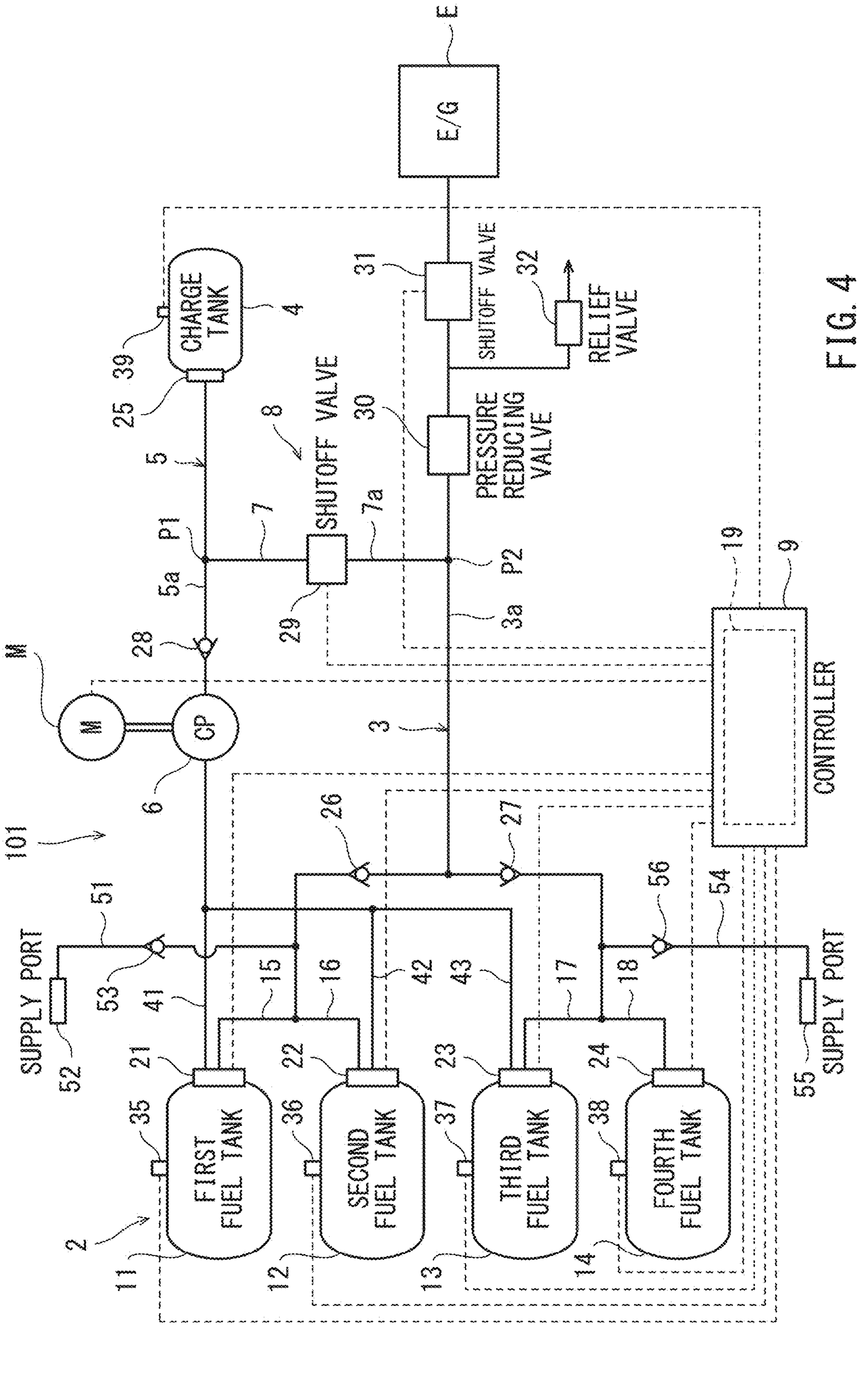
FIG. 4 is a block diagram of the internal combustion engine system of Modified Example.

FIG. 4 is a block diagram of an internal combustion engine system 101 of Modified Example. The same reference signs are used for the same components as the above embodiment, and explanations thereof are omitted. As shown in FIG. 4, the internal combustion engine system 101 of Modified Example does not include a component that transmits the power of the internal combustion engine E to the compressor 6. Instead, the internal combustion engine system 101 includes an electric motor M as a driving source that is different from the internal combustion engine E. The electric motor M serves as a compressor driving source and is connected to the compressor 6 to drive the compressor 6. The processing circuitry 19 controls the electric motor M to drive the compressor 6.

The processing circuitry 19 can control the compressor 6 without being influenced by a driving state of the internal combustion engine E. To be specific, since the driving power supplied to the compressor 6 can be set regardless of the output of the internal combustion engine E, the controllability of the compressor 6 can be improved. For example, the compressor 6 can be easily stopped when the driving of the compressor 6 is unnecessary. Since the other components are the same as those in the above embodiment, explanations thereof are omitted.

Embodiment 2

Figure 5:
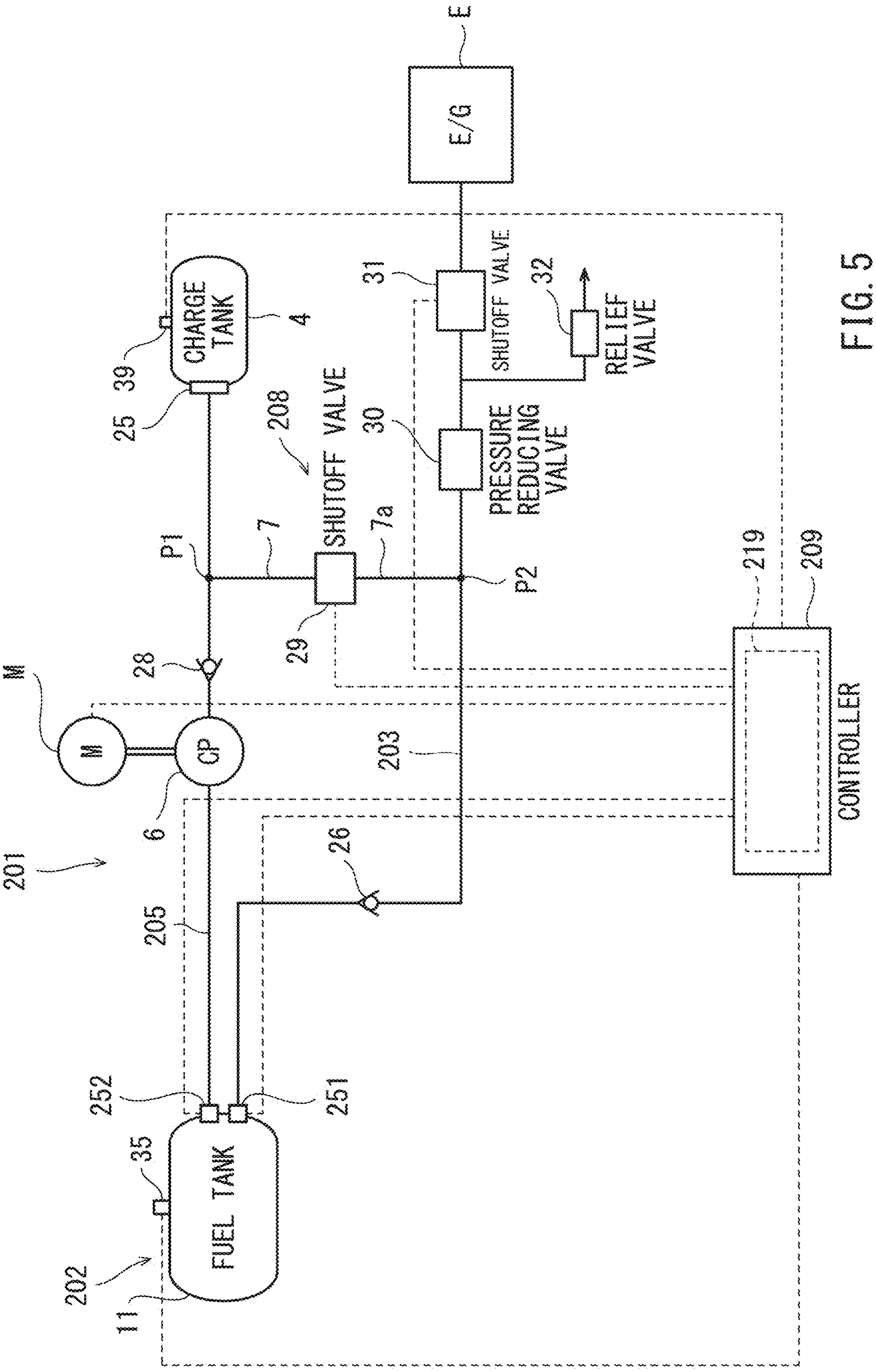
FIG. 5 is a block diagram of the internal combustion engine system according to Embodiment 2.

FIG. 5 is a block diagram of an internal combustion engine system 201 according to Embodiment 2. The same reference signs are used for the same components as Embodiment 1, and explanations thereof are omitted. As shown in FIG. 5, the internal combustion engine system 201 of Embodiment 2 includes only one fuel tank 11 as a fuel storing source 202. A controller 209 includes processing circuitry 219. A valve system 208 includes fuel tank valves 251 and 252, the charge tank valve 25, the check valves 26 and 28, the shutoff valves 29 and 31, the pressure reducing valve 30, and the relief valve 32.

The fuel tank valves 251 and 252 are electromagnetic valves that are electrically controllable. The fuel tank valve 251 operates in a closed state in which the port of the fuel tank 11 is closed or an open state in which the port of the fuel tank 11 communicates with a main channel 203. The fuel tank valve 252 operates in a closed state in which the port of the fuel tank 11 is closed or an open state in which the port of the fuel tank 11 communicates with a charge channel 205.

A hardware configuration of the controller 209 is the same as that of the controller 9 of Embodiment 1. However, since the number of fuel tanks 11 constituting the fuel storing source 202 is one, control contents of the processing circuitry 219 of Embodiment 2 are different from those of the processing circuitry 19 of Embodiment 1.

Figure 6:
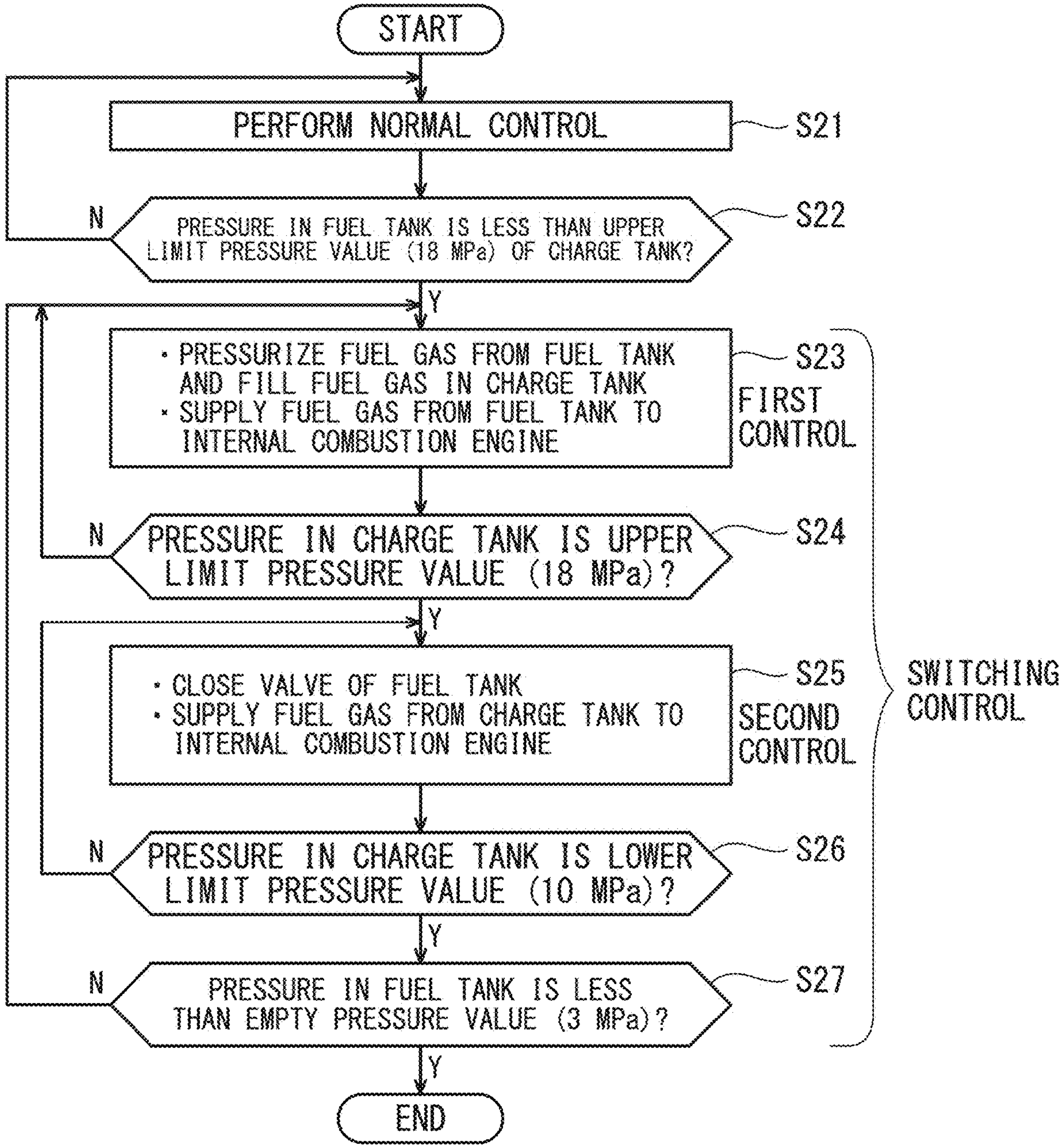
FIG. 6 is a flowchart for explaining the control of the system of FIG. 5.
Figure 7:
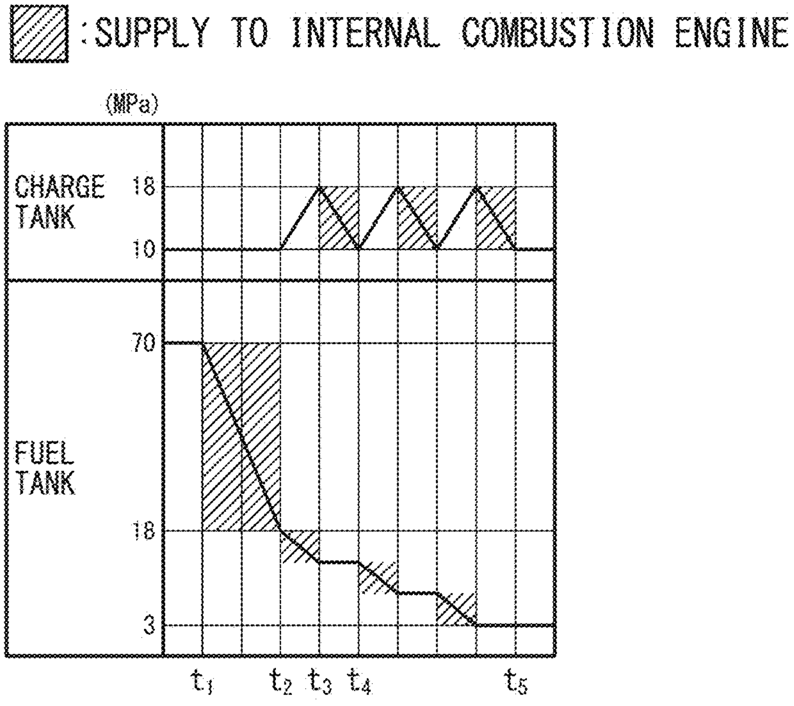
FIG. 7 is a timing chart showing the states of the tanks of the system of FIG. 5.

FIG. 6 is a flowchart for explaining the control of the system 201 of FIG. 5. FIG. 7 is a timing chart showing the states of the tanks of the system 201 of FIG. 5. Hereinafter, the processing of the processing circuitry 219 of the controller 209 will be described based on the flow of FIG. 6 with reference to the configuration of FIG. 5 and the timing chart of FIG. 7. First, the processing circuitry 219 performs the normal control in which the fuel gas in the fuel tank 11 is supplied to the internal combustion engine E (Step S21; the time point t1 in FIG. 7). The normal control is control in which when the pressure of the fuel gas stored in the fuel tank 11 is the upper limit pressure value of the charge tank 4 or more, the fuel gas from the fuel tank 11 is supplied to the internal combustion engine E with the charge channel 5 in a closed state.

Specifically, the processing circuitry 219 sets the fuel tank valve 251 to the open state in which the port of the fuel tank 11 communicates with the main channel 203, and also sets the fuel tank valve 252 to the open state in which the port of the fuel tank 11 communicates with the charge channel 205. At this time, the processing circuitry 219 closes the shutoff valve 29, opens the shutoff valve 31, and stops the electric motor M to stop the compressor 6.

The processing circuitry 219 determines whether or not the internal pressure of the fuel tank 11 which is detected by the fuel tank pressure sensor 35 is less than the predetermined upper limit pressure value (18 MPa, for example) of the charge tank 4 (Step S22). When it is determined that the internal pressure of the fuel tank 11 is not less than the upper limit pressure value of the charge tank 4 (No in Step S22), the processing circuitry 219 returns to Step S21.

When it is determined that the internal pressure of the fuel tank 11 is less than the upper limit pressure value of the charge tank 4 (Yes in Step S22), the processing circuitry 219 executes the "first control" (Step S23; the time point t2 in FIG. 7). The first control is control in which the valve system 208 and the compressor 6 are controlled such that while the fuel gas from the fuel tank 11 is being supplied to the internal combustion engine E, the fuel gas from the fuel tank 11 is pressurized and filled in the charge tank 4.

Specifically, the processing circuitry 219 opens the charge tank valve 25, opens the fuel tank valve 251 to make the port of the fuel tank 11 communicate with the main channel 203, opens the fuel tank valve 252 to make the port of the fuel tank 11 communicate with the charge channel 205, and drives the electric motor M to operate the compressor 6. Thus, the fuel gas from the fuel tank 11 is pressurized by the compressor 6 and filled in the charge tank 4, and at the same time, the fuel gas from the fuel tank 11 is supplied to the internal combustion engine E.

The processing circuitry 219 determines whether or not the internal pressure of the charge tank 4 which is detected by the charge tank pressure sensor 39 has reached the upper limit pressure value (18 MPa, for example) (Step S24). The upper limit pressure value in Step S24 and the upper limit pressure value in Step S22 may be different from each other. When it is determined that the internal pressure of the charge tank 4 has not reached the upper limit pressure value (No in Step S4), the processing circuitry 219 returns to Step S23.

When it is determined that the internal pressure of the charge tank 4 has reached the upper limit pressure value (Yes in Step S24), the processing circuitry 219 executes the "second control" (Step S25; the time point t3 in FIG. 7). The second control is control in which the valve system 208 is controlled such that the fuel gas from the charge tank 4 is supplied to the internal combustion engine E. In the present embodiment, the supply of the fuel gas from the fuel tank 11 to the internal combustion engine E is stopped during the execution of the second control. Specifically, the processing circuitry 219 stops the electric motor M to stop the compressor 6, sets the fuel tank valve 251 to a closed state, and opens the fuel tank valve 251, the charge tank valve 25, and the shutoff valve 29 to supply the fuel gas from the charge tank 4 to the internal combustion engine E.

The supply of the fuel gas from the fuel tank 11 to the internal combustion engine E may not be stopped during the execution of the second control. To be specific, the fuel gas may be supplied from the fuel tank 11 to the internal combustion engine E at the same time when the fuel gas is supplied from the charge tank 4 to the internal combustion engine E.

The processing circuitry 219 determines whether or not the internal pressure of the charge tank 4 which is detected by the charge tank pressure sensor 39 has reached the predetermined lower limit pressure value (10 MPa, for example) (Step S26). When it is determined that the internal pressure of the charge tank 4 has not reached the lower limit pressure value (No in Step S26), the processing circuitry 219 returns to Step S25.

When it is determined that the internal pressure of the charge tank 4 has reached the lower limit pressure value (Yes in Step S26), the processing circuitry 219 determines whether or not the internal pressure of the fuel tank 11 is less than a predetermined empty pressure value (3 MPa, for example) (Step S8). The empty pressure value is a pressure limit value at which the fuel gas can be pressurized by the compressor 6 and filled in the charge tank 4. When it is determined that the internal pressure of the fuel tank 11 is not less than the empty pressure value (3 MPa, for example) (No in Step S27), the processing circuitry 219 returns to Step S23 (the time point t4 in FIG. 7). To be specific, the processing circuitry 219 executes the switching control in which the first control and the second control are alternately repeated.

When it is determined that the internal pressure of the fuel tank 11 is less than the empty pressure value (3 MPa, for example) (Yes in Step S27), the processing circuitry 219 closes the fuel tank valves 251 and 252 and the charge tank valve 25 to stop the internal combustion engine E (the time point t5 in FIG. 7).

According to the above-described configuration, even when the pressure of the fuel gas in the fuel tank 11 lowers, the fuel gas can be pressurized by the compressor 6, filled in the charge tank 4, and supplied from the charge tank 4 to the internal combustion engine E. Therefore, the amount of fuel gas that can be supplied to the internal combustion engine E can be increased, and this can increase the cruising distance of the movable body V.

Moreover, the fuel gas is supplied from the fuel tank 11 to the internal combustion engine E, and at the same time, the fuel gas from the fuel tank 11 is pressurized and filled in the charge tank 4. Therefore, the compressor 6 can be operated by effectively utilizing a time in which the fuel gas is being supplied from the fuel tank 11 to the internal combustion engine E. Thus, the operation opportunity of the compressor 6 can be increased, and this can reduce the compression amount of the compressor 6 per unit time. Therefore, the size and required power of the compressor 6 can be reduced.

Moreover, the switching control in which the first control and the second control are alternately repeated is executed, and the operation of filling the charge tank 4 with the fuel gas and supplying the fuel gas from the charge tank 4 to the internal combustion engine E is executed plural times. Therefore, the upper limit pressure value and volume of the fuel gas to be pressurized and filled in the charge tank 4 do not have to be made large. Thus, the necessity of increasing the withstand pressure performance and volume of the charge tank 4 can be eliminated.

The technology of the present disclosure is not limited to the above embodiments. The present system is suitably applicable to a movable body that is required to be reduced in size. However, the present system is not limited to this. For example, the present system may be applied to a fixed object, such as a fixed facility. Each of the configurations of the channels and the valve systems in the embodiments is merely one example. Moreover, for example, the internal combustion engine E is described as the fuel consumption apparatus to which the fuel gas is supplied from the fuel storing source. However, the fuel consumption apparatus may be another object (a fuel cell, for example).

A pressure reducing valve that reduces the pressure to less than the upper limit pressure value of the charge tank 4 may be located at a channel between the fuel storing source 2 or 202 and the compressor 6. In this case, control in which the fuel gas is supplied from the fuel storing source 2 or 202 to the internal combustion engine E, and at the same time, the fuel gas from the fuel storing source 2 or 202 is pressurized by the compressor 6 and filled in the charge tank 4 may be performed instead of the normal control. Moreover, whether or not the internal pressure of the charge tank 4 has reached the upper limit pressure value may be determined based on information other than the detected value of the pressure sensor. For example, whether or not the internal pressure of the charge tank 4 has reached the upper limit pressure value may be determined based on at least one of the operating time of the compressor 6, the detected value of a flow meter, and the detected value of a temperature sensor.

The supply of the fuel gas in the last fuel tank (fourth fuel tank 14) in Embodiment 1 is controlled as in Embodiment 2. Thus, the amount of unconsumed fuel gas remaining in the last fuel tank (fourth fuel tank 14) can be reduced. Moreover, the control shown in FIGS. 2 and 3 is one example and may be other control. For example, while the fuel gas in the third fuel tank 13 is being supplied to the internal combustion engine E after the fuel gas in the first fuel tank 11 and the second fuel tank 12 is supplied to the internal combustion engine E, the fuel gas in both of the first fuel tank 11 and the second fuel tank 12 may be compressed by the compressor 6 and filled in the charge tank 4.

The foregoing has described the embodiments as examples of the technology disclosed in the present application. However, the technology in the present disclosure is not limited to these and is applicable to embodiments in which modifications, replacements, additions, omissions, and the like have been suitably made. Moreover, a new embodiment may be prepared by combining the components described in the above embodiments. For example, some of components or methods in one embodiment may be applied to another embodiment. Some components in an embodiment may be separated from the other components in the embodiment and arbitrarily extracted. Furthermore, the components shown in the attached drawings and the detailed explanations include not only components essential to solve the problems but also components for exemplifying the above technology and not essential to solve the problems.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

The following aspects disclose preferred embodiments.

First Aspect

A method of supplying fuel to a fuel consumption apparatus, the method including:

while supplying a fuel gas from a fuel storing source to a fuel consumption apparatus, pressurizing the fuel gas from the fuel storing source by a compressor and filling the fuel gas in a charge tank; and when pressure of the fuel gas in the charge tank reaches a predetermined upper limit pressure value, stopping the supply of the fuel gas from the fuel storing source to the fuel consumption apparatus and supplying the fuel gas from the charge tank to the fuel consumption apparatus until the pressure of the fuel gas in the charge tank reaches a predetermined lower limit pressure value.

According to this configuration, even when the pressure of the fuel gas in the fuel storing source lowers, the fuel gas can be pressurized by the compressor, filled in the charge tank, and supplied from the charge tank to the internal combustion engine. Therefore, the amount of fuel gas that can be supplied to the internal combustion engine can be increased. Moreover, the fuel gas is supplied from the fuel storing source to the internal combustion engine, and at the same time, the fuel gas from the fuel storing source is pressurized and filled in the charge tank. Therefore, the compressor can be operated by effectively utilizing a time in which the fuel gas is being supplied from the fuel storing source to the internal combustion engine. Thus, the operation opportunity of the compressor can be increased, and this can reduce the compression amount of the compressor per unit time. Therefore, the size and required power of the compressor can be reduced.

Second Aspect

The internal combustion engine system according to the first aspect, wherein the processing circuitry is configured to execute switching control in which the first control and the second control are alternately repeated.

According to this configuration, the operation of filling the charge tank with the fuel gas and supplying the fuel gas from the charge tank to the internal combustion engine is executed plural times. Therefore, the upper limit pressure value and volume of the fuel gas to be pressurized and filled in the charge tank do not have to be made large. Thus, the necessity of increasing the withstand pressure performance and volume of the charge tank can be eliminated.

Third Aspect

The internal combustion engine system according to the first or second aspect, wherein when the processing circuitry determines that pressure of the fuel gas filled in the charge tank has reached a predetermined upper limit pressure value, the processing circuitry executes the second control.

According to this configuration, when it is determined that the pressure of the fuel gas filled in the charge tank has reached the upper limit pressure value, the fuel gas filled in the charge tank is utilized for the supply to the internal combustion engine. Therefore, a time in which the pressure in the charge tank is less than the upper limit value increases. Thus, the operation of the compressor in a state in which the pressure of the fuel gas in the charge tank is higher than the upper limit pressure value can be reduced, and this can reduce the required compression ability of the compressor.

Fourth Aspect

The internal combustion engine system according to any one of the first to third aspects, wherein:

- the at least one fuel tank includes a first fuel tank and a second fuel tank;
- the main channel includes
  - a first main channel that connects the first fuel tank to the internal combustion engine and
  - a second main channel that connects the second fuel tank to the internal combustion engine;
- the charge channel includes a first charge channel that connects the first fuel tank to the charge tank; and
- in the first control, the valve system and the compressor are controlled such that the fuel gas from the second fuel tank is supplied to the internal combustion engine, and the fuel gas from the first fuel tank is pressurized and filled in the charge tank.

According to this configuration, the first fuel tank and the second fuel tank perform their respective roles, and both of the fuel supply to the internal combustion engine and the fuel filling of the charge tank can be easily performed.

Fifth Aspect

The internal combustion engine system according to the fourth aspect, wherein when it is determined that pressure of the fuel gas stored in the first fuel tank is less than an upper limit pressure value of the charge tank, the first control is executed.

According to this configuration, the fuel gas of the first fuel tank which has been reduced in pressure can be appropriately filled in the charge tank by the compressor and can be utilized for the supply to the internal combustion engine. Since the gas which has been reduced in pressure is pressurized by the compressor, the required compression ability of the compressor can be made lower than when pressurized gas is further pressurized.

Sixth Aspect

The internal combustion engine system according to any one of the first to fifth aspects, wherein the internal combustion engine includes a direct injection engine.

The required pressure of the fuel gas to be supplied to the direct injection engine is higher than the required pressure of the fuel gas to be supplied to the non-direct injection engine. Therefore, when the charge tank and the compressor are not included, and the fuel storing source is regarded as the empty state, the amount of fuel gas remaining in the fuel storing source is large. However, according to the present internal combustion engine system, the fuel gas in the fuel storing source is utilized for the supply to the internal combustion engine as much as possible by the charge tank and the compressor. Therefore, the fuel gas in the fuel storing source can be efficiently utilized.

Seventh Aspect

The internal combustion engine system according to any one of the first to sixth aspects, further including:

- an energy transmitting path through which energy generated by the internal combustion engine is transmitted as rotational power to the compressor;
- an energy transmission selector that establishes and cuts the energy transmitting path; and
- an actuator that drives the energy transmission selector, wherein
- the processing circuitry is configured to control the actuator to drive the compressor.

According to this configuration, the energy efficiency can be improved by the simple configuration.

Eighth Aspect

The internal combustion engine system according to any one of the first to seventh aspects, further including a compressor driving source that is a driving source different from the internal combustion engine and drives the compressor, wherein

- the processing circuitry is configured to control the compressor driving source to drive the compressor.

According to this configuration, the compressor can be controlled without being influenced by the driving state of the internal combustion engine. To be specific, since the driving power supplied to the compressor can be set regardless of the output of the internal combustion engine, the controllability of the compressor can be improved. For example, the compressor can be stopped when the driving of the compressor is unnecessary. Therefore, the control of the compressor can be easily realized in accordance with situations.

Ninth Aspect

The internal combustion engine system according to any one of the first to eighth aspects, wherein the fuel gas includes a hydrogen gas.

As a fuel amount required to obtain the same output of the internal combustion engine, the amount of hydrogen gas is larger than the amount of carbon fuel. In other words, the consumption mount of hydrogen gas per utilization time in the tank is larger than that of carbon fuel per utilization time in the tank. According to the present internal combustion engine system, the amount of fuel gas in the fuel tank which can be effectively supplied to the internal combustion engine can be increased. Therefore, the effect of the effective utilization of the hydrogen gas whose consumption amount is relatively large can be made significant.

Tenth Aspect

A movable body including:

the internal combustion engine system according to any one of the first to ninth aspects; and a propulsive power generator that generates propulsive power by driving power generated by the internal combustion engine.

According to this configuration, in a period from when the fuel gas is filled in the fuel storing source until when the fuel gas is refilled in the fuel storing source, the amount of fuel gas that can be supplied to the internal combustion engine can be increased. Therefore, the cruising distance of the movable body can be increased.

Eleventh Aspect

A method of supplying fuel to a fuel consumption apparatus, the method including:

while supplying a fuel gas from a fuel storing source to a fuel consumption apparatus, pressurizing the fuel gas from the fuel storing source by a compressor and filling the fuel gas in a charge tank; and when pressure of the fuel gas in the charge tank reaches a predetermined upper limit pressure value, stopping the supply of the fuel gas from the fuel storing source to the fuel consumption apparatus and supplying the fuel gas from the charge tank to the fuel consumption apparatus until the pressure of the fuel gas in the charge tank reaches a predetermined lower limit pressure value.

According to this method, even when the pressure of the fuel gas in the fuel storing source lowers, the fuel gas can be pressurized by the compressor, filled in the charge tank, and supplied from the charge tank to the internal combustion engine. Therefore, the amount of fuel gas that can be supplied to the fuel consumption apparatus can be increased. Moreover, while the fuel gas is being supplied from the fuel storing source to the fuel consumption apparatus, the fuel gas from the fuel storing source is pressurized and filled in the charge tank. Therefore, the compressor can be operated by effectively utilizing a time in which the fuel gas is being supplied from the fuel storing source to the fuel consumption apparatus. Thus, the operation opportunity of the compressor can be increased, and this can contribute to the reduction in the compression amount of the compressor per unit time. Moreover, when the pressure of the fuel gas in the charge tank reaches the predetermined upper limit pressure value, the supply of the fuel gas from the fuel storing source to the fuel consumption apparatus is stopped, and the supply of the fuel gas from the charge tank to the fuel consumption apparatus is prioritized. Therefore, the operation of the compressor in a state in which the pressure of the fuel gas in the charge tank is higher than the upper limit pressure value can be reduced, and this can reduce the required compression ability of the compressor.

The invention claimed is:

1. An internal combustion engine system comprising:

a fuel storing source including at least one fuel tank that stores a fuel gas in a compressed state;

a main channel that connects the fuel storing source to an internal combustion engine;

a charge tank;

a charge channel that connects the fuel storing source to the charge tank;

a compressor that pressurizes the fuel gas of the charge channel toward the charge tank;

a sub-channel that connects the charge tank to the internal combustion engine;

a valve system that opens and closes the main channel, the charge channel, and the sub-channel; and processing circuitry configured to control the valve system and the compressor, wherein the processing circuitry is configured to execute a first control in which the valve system and the compressor are controlled such that while the fuel gas from the fuel storing source is being supplied to the internal combustion engine, the fuel gas from the fuel storing source is pressurized and filled in the charge tank, after the charge tank is filled with the fuel gas by the first control, execute a second control in which the valve system is controlled such that the fuel gas from the charge tank is supplied to the internal combustion engine, the second control being executed instead of the first control, when a pressure of the fuel gas in the charge tank lowers to a predetermined pressure value by the execution of the second control, execute the next first control instead of the second control, and after the charge tank is filled with the fuel gas by the next first control, execute the next second control, in which the valve system is controlled such that the fuel gas from the charge tank is supplied to the internal combustion engine, instead of the next first control.

2. The internal combustion engine system according to claim 1, wherein the processing circuitry is configured to execute a switching control in which the first control and the second control are alternately repeated.

3. The internal combustion engine system according to claim 1, wherein:

when the processing circuitry determines during the execution of the first control that the pressure of the fuel gas filled in the charge tank has reached a predetermined upper limit pressure value, the processing circuitry executes the second control; and the upper limit pressure value is higher than a required pressure value of the fuel gas to be supplied to the internal combustion engine.

4. The internal combustion engine system according to claim 1, wherein:

the at least one fuel tank comprises a first fuel tank and a second fuel tank;

the main channel includes a first main channel that connects the first fuel tank to the internal combustion engine and a second main channel that connects the second fuel tank to the internal combustion engine;

the charge channel includes a first charge channel that connects the first fuel tank to the charge tank; and in the first control, the valve system and the compressor are controlled such that the fuel gas from the second fuel tank is supplied to the internal combustion engine, and the fuel gas from the first fuel tank is pressurized and filled in the charge tank.

5. The internal combustion engine system according to claim 4, wherein when it is determined that a pressure of the fuel gas stored in the first fuel tank is less than an upper limit pressure value of the charge tank, the first control is executed.

6. The internal combustion engine system according to claim 1, wherein the internal combustion engine includes a direct injection engine.

7. The internal combustion engine system according to claim 1, further comprising:

an energy transmitting path through which energy generated by the internal combustion engine is transmitted as a rotational power to the compressor;

an energy transmission selector that establishes and cuts the energy transmitting path; and an actuator that drives the energy transmission selector, wherein the processing circuitry is configured to control the actuator to drive the compressor.

8. The internal combustion engine system according to claim 1, further comprising a compressor driving source that is a driving source different from the internal combustion engine and that drives the compressor, wherein the processing circuitry is configured to control the compressor driving source to drive the compressor.

9. The internal combustion engine system according to claim 1, wherein the fuel gas includes a hydrogen gas.

10. A movable body comprising:

the internal combustion engine system according to claim 1; and a propulsive power generator that generates a propulsive power by a driving power generated by the internal combustion engine.

11. The internal combustion engine system according to claim 1, wherein when the processing circuitry determines during the execution of the second control that the pressure of the fuel gas in the charge tank has reached a predetermined lower limit pressure value, the processing circuitry executes the next first control.

12. The internal combustion engine system according to claim 1, wherein:

the processing circuitry is configured to:

when the processing circuitry determines that a pressure of the fuel gas stored in the fuel storing source is a predetermined upper limit pressure value or more, execute a normal control in which the valve system is controlled such that the fuel gas from the fuel storing source is supplied to the internal combustion engine without being filled in the charge tank; and when the processing circuitry determines during the execution of the normal control that the pressure of the fuel gas stored in the fuel storing source has lowered to less than the predetermined upper limit pressure value, execute the second control; and the predetermined upper limit pressure value is higher than a required pressure value of the fuel gas to be supplied to the internal combustion engine.

13. A method of supplying a fuel gas to a fuel consumption apparatus, the method comprising:

executing a first supply operation of, while supplying the fuel gas from a fuel storing source to a fuel consumption apparatus, pressurizing the fuel gas from the fuel storing source by a compressor and filling the fuel gas in a charge tank;

executing a second supply operation of, when a pressure of the fuel gas in the charge tank reaches a predetermined upper limit pressure value, stopping the supply of the fuel gas from the fuel storing source to the fuel consumption apparatus and supplying the fuel gas from the charge tank to the fuel consumption apparatus until the pressure of the fuel gas in the charge tank reaches a predetermined lower limit pressure value;

when the pressure of the fuel gas in the charge tank lowers by the second supply operation to reach the lower limit pressure value, executing the next first supply operation instead of the second supply operation; and when the pressure of the fuel gas in the charge tank increases by the next first supply operation to reach the upper limit pressure value, executing the next second supply operation instead of the next first supply operation.

* * * * *